United States Patent [19]

Puel

[11] 4,092,064
[45] May 30, 1978

[54] PROJECTORS

[75] Inventor: Jean-Pierre Puel, Paris, France

[73] Assignee: Realist, Inc., Menomonee Falls, Wis.

[21] Appl. No.: 695,016

[22] Filed: Jun. 11, 1976

[30] Foreign Application Priority Data

Jun. 25, 1975  United Kingdom .............. 26854/75

[51] Int. Cl.² ............................................ G03B 21/24
[52] U.S. Cl. ...................................................... 353/79
[58] Field of Search .................................... 353/72, 79

[56] References Cited

U.S. PATENT DOCUMENTS

| 2,506,168 | 5/1950 | Perillo | 353/72 |
| 2,847,902 | 8/1958 | D'Incerti | 353/72 |

FOREIGN PATENT DOCUMENTS

| 1,016,853 | 9/1952 | France | 353/79 |
| 278,552 | 10/1930 | Italy | 353/79 |
| 465,467 | 9/1951 | Italy | 353/79 |
| 347,835 | 5/1931 | United Kingdom | 353/79 |
| 750,319 | 6/1956 | United Kingdom | 353/79 |

*Primary Examiner*—Harry N. Haroian

[57] ABSTRACT

The portable projector has a drawer which is pulled forward for use and to gain access to the opal glass rear projection screen which is inserted into the slot in the front of the drawer. The projection lens is removed from its storage compartment in the drawer and threaded into the optical housing after it has been pivoted to its upright position. A selected microfiche is inserted in the slot between the optical housing and the lensboard and is retained in selected position by friction from velour facings in the slot. The bulb is low voltage, low power to permit use of battery power or line voltage through a transformer. If the opal glass is not used, the image can be projected on a light colored surface within the limitations of the bulb intensity and ambient light.

4 Claims, 5 Drawing Figures

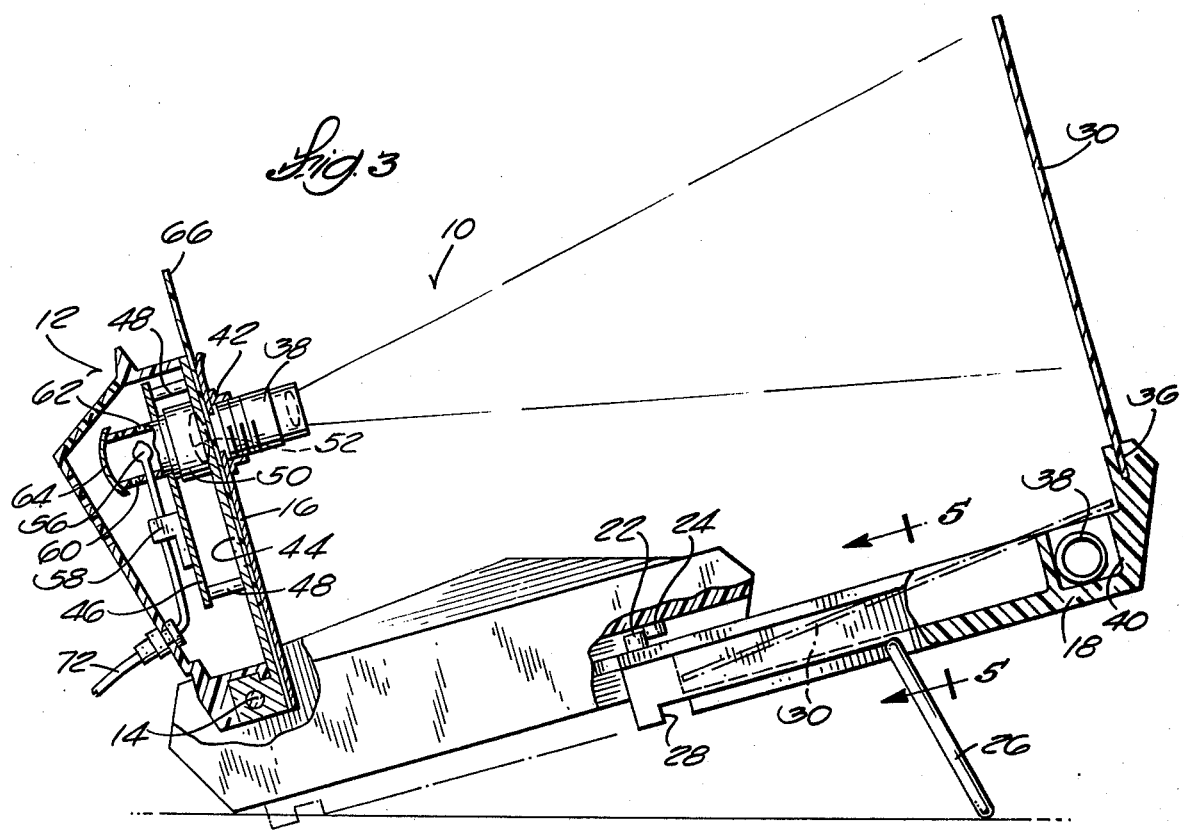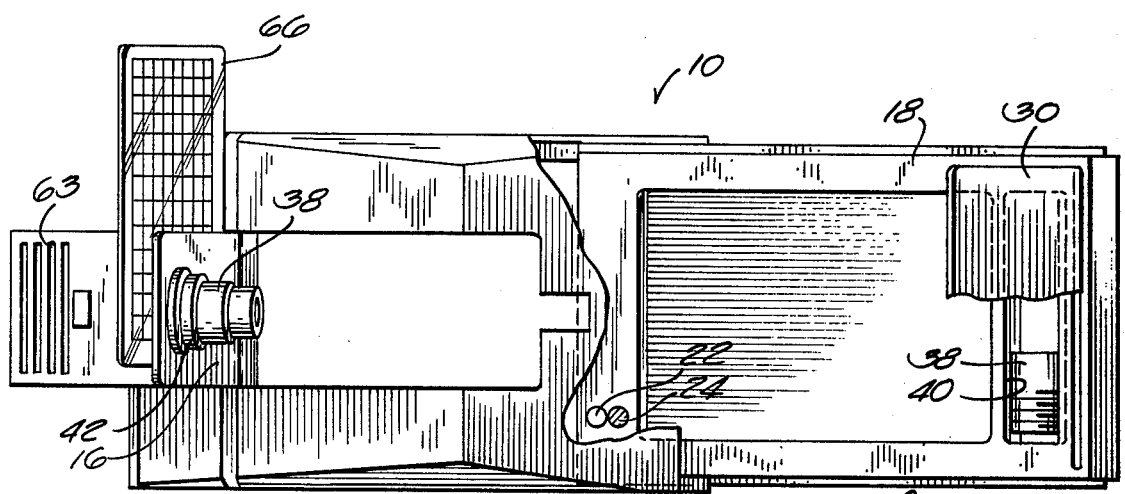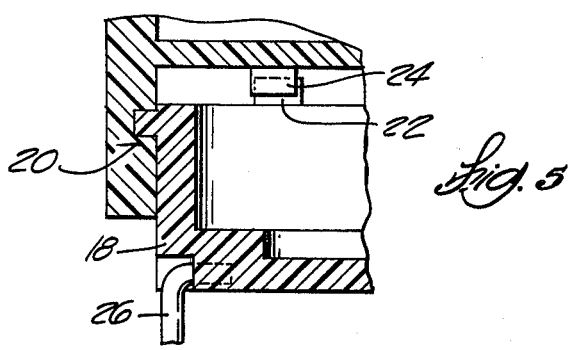

PROJECTORS

BACKGROUND OF THE INVENTION

The use of microfiche is rapidly expanding and it has become common to provide servicemen with relevant information on microfiche cards. The serviceman customarily uses some form of hand-held viewer to "read" the card. This, however, requires one hand to hold the card and sometimes interferes with doing the work.

SUMMARY OF THE INVENTION

The object of this invention is to provide a highly portable projector which can be used on the job to provide a projected image for constant reference while performing the service work. When collapsed the present unit is very small and very portable. When placed in use the image is easily read by the user and can be observed constantly. If the space in which the work is being done is quite tight, the image can be projected in a light colored surface. After use the cards, lens and projection screen are stored inside the unit.

DESCRIPTION OF THE DRAWINGS

FIG. 3 is a longitudinal section of the reader.

FIG. 4 is a plan view with parts broken away.

FIG. 5 is a fragmentary sectional view taken on line 5—5 of FIG. 3.

DESCRIPTION OF THE PREFERRED EMBODIMENT

Figure 1:
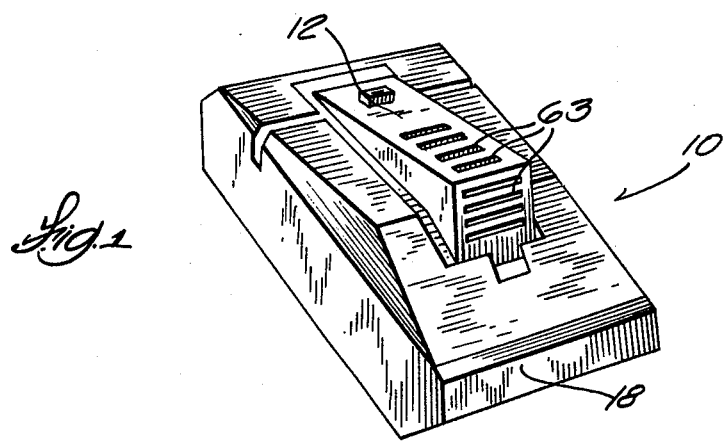
FIG. 1 is a perspective view of the microfiche reader when closed.
Figure 2:
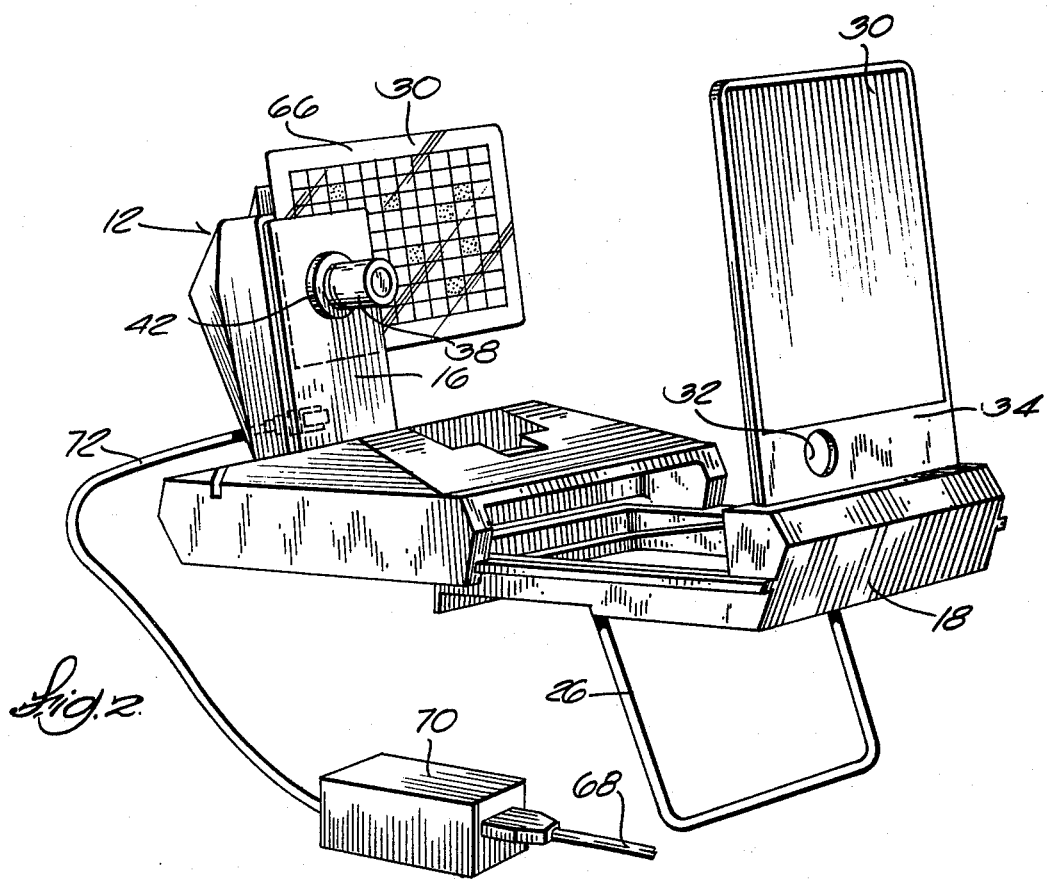
FIG. 2 is a perspective view of the microfiche reader in operating position.

As shown in the drawings, the microfiche reader or projector comprises a case 10 into which the optical housing 12 is folded when the reader is closed as shown in FIG. 1. The optical housing 12 is pivotally connected to the case on pins 14 and can be erected as shown in FIGS. 2 and 3 to position the lensboard 16 perpendicular to the case. The lower portion of the case is provided with a drawer 18 which can be moved forwardly on the drawer guide 20, illustrated as a tongue and groove guide, until the stop 22 (fixed on the drawer) strikes the fixed stop 24. The U-shaped support foot 26 pivotally connected to the underside of the drawer may be moved into position shown in FIGS. 2 and 3 to incline the projector upwardly at a convenient angle. When the foot pivots against the underside of the drawer it is received in groove 28.

When the drawer has been pulled to the forward position the translucent or opal glass screen 30 which is transported in the drawer can be removed easily by inserting a finger through hole 32 in the glass frame 34. The screen is then placed in slot 36 in the upper front edge of the drawer. The appropriate lens 38 of the several which may be stored in the small drawer compartment 40 along the front edge of the inside of the drawer is now threaded into the lens mount 42 fixed on lensboard 16.

The optical housing 12 is provided with a front wall 44 and a parallel spaced support plate 46 carried on the front wall by pins 48. A lens barrel 50 is fixed between wall 44 and plate 46 and houses the condenser lens assembly 52 while the rearwardly projecting portion of the barrel comprises a housing 54 for lamp 56 supported by bracket 58. Suitable holes 60, 62 in the lamp housing provide for convection cooling of the lamp which is preferably the low voltage, low power type. The optical housing is provided with slots 63 to allow air flow through the housing. The light from the lamp is reflected by reflector 64 to pass through the condenser lenses and the projection lens 38.

A microfiche card 66, selected from those stored in the drawer, is inserted between the lensboard 16 and the front wall 44 of the optical housing. The facing surfaces of the wall 44 and the lensboard 16 are preferably provided with velour or the like to guard against scratches and frictionally retain the microfiche card in the selected position so as to permit the desired image to be projected onto the screen 30.

With the low voltage bulb the lamp may be illuminated either from a transformer power source such as illustrated in FIG. 2 where the cord 68 coming from the main supply is connected to a transformer 70 and then a connecting cord 72 plugs into the optical housing or may be powered by a cord plugged into the optical housing and provided with an adapter permitting it to be plugged into the 12-volt system found in an auto or truck, for example, via the cigarette lighter receptacle. Finally, for complete portability alligator clips or the like may be provided for connecting to a battery. By connecting directly to the optical housing the housing can be made as a complete subassembly and merely mounted in the case on its pivots without need for additional wiring.

In use the viewer observes the projected image projected onto the opal glass which serves as a rear projection screen with the image being viewed from the front. If space limitations make it difficult to use the projected image in that manner or if the image is too small, the screen may be removed and the image can be directly projected onto a light-colored surface. Finally, if that is not satisfactory, the pin 14 can be removed and the optical housing itself can be used as a hand-held projector.

When the unit is not in use, the lens 38 is removed from the lens mount 42 and stored in the drawer, all the microfiche cards are placed in the drawer, and the projection screen 30 is also placed in the drawer. The support foot 26 is folded back under the drawer and the drawer is pushed back into the case 10. Suitable detent action can be provided for the support foot and for the extended and retracted positions of the drawer. The optical housing 12 is then folded down into the case and, again, a detent action can be provided to insure against inadvertent movement of the housing from the case. When the case is folded the entire unit has maximum external dimensions of only 228 × 140 × 70 mm and thus is very compact and easy to transport. In use the reader permits the serviceman to constantly refer back to the microfiche for further information as opposed to other portable arrangements wherein it is essentially a hand-held viewer requiring that the user, in effect, take his hands off his work and manipulate the viewer. Also frequently when a hand-held viewer is laid down the microfiche will move and require reorientation when next used.

I claim:

1. A projector comprising
   a case having an upper surface provided with an aperture therein originating at the rear portion thereof and extending forwardly along the centerline of said surface and having smaller length and width than the surface, an optical housing pivotally connected to the upper rear portion of the case for movement between an erect position and a folded position in which it is received in and closes said aperture and in conjunction with said upper surface forms the top of the case, a lens mounted in said housing when the housing is in said erect position and stored in the case when the housing is in folded position, a projection screen, means for supporting the screen normal to the projection axis, said means comprising a drawer slidably mounted in the lower portion of the case for movement between a first position in which it forms the bottom of the case and an extended position in which the front of the drawer is positioned substantially in front of the front of the case, and an upwardly opening slot in the front of the drawer to receive said projection screen, a light source in said housing; and a power supply for the light source.

2. A projector according to claim 1 in which the optical housing includes means receiving and retaining a microfiche in desired position in the film stage.

3. A projector according to claim 1 including a support stand pivoted to the underside of the drawer for movement between a storage position flat against the underside and a use position in which it functions to elevate the front of the projector.

4. A projector according to claim 1 in which the interior dimensions of the drawer are adequate to receive said screen and a plurality of microfiche cards.

* * * * *